United States Patent
Braga

(10) Patent No.: US 10,543,448 B2
(45) Date of Patent: Jan. 28, 2020

(54) AGGLOMERATION-RESISTANT DESULFURIZING PRODUCT

(71) Applicant: M-I L.L.C., Houston, TX (US)

(72) Inventor: Thomas G. Braga, St. Louis, MO (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 15/657,538

(22) Filed: Jul. 24, 2017

(65) Prior Publication Data

US 2017/0320007 A1 Nov. 9, 2017

Related U.S. Application Data

(62) Division of application No. 13/976,389, filed as application No. PCT/US2011/067887 on Dec. 29, 2011, now Pat. No. 9,713,786.

(60) Provisional application No. 61/429,601, filed on Jan. 4, 2011.

(51) Int. Cl.
| | |
|---|---|
| *B01J 20/00* | (2006.01) |
| *B01D 53/00* | (2006.01) |
| *C10G 70/00* | (2006.01) |
| *C10L 3/10* | (2006.01) |
| *B32B 15/04* | (2006.01) |
| *B32B 15/10* | (2006.01) |

(52) U.S. Cl.
CPC ............ *B01D 53/00* (2013.01); *B32B 15/046* (2013.01); *B32B 15/10* (2013.01); *C10G 70/00* (2013.01); *C10L 3/103* (2013.01); *C10G 2300/202* (2013.01); *C10G 2300/703* (2013.01); *Y10T 428/31989* (2015.04)

(58) Field of Classification Search
CPC ....... B32B 15/046; B32B 15/10; C10G 70/00; C10L 3/103
USPC ............. 208/15, 208, 244, 16; 502/407, 402
See application file for complete search history.

(56) References Cited

U.S. PATENT DOCUMENTS

| | | | |
|---|---|---|---|
| 5,264,194 A | 11/1993 | Fox et al. | |
| 5,320,992 A | 6/1994 | Fox et al. | |
| 5,632,931 A | 5/1997 | Fox et al. | |
| 6,228,802 B1 | 5/2001 | Scranton et al. | |
| 6,664,210 B1 | 12/2003 | Scranton et al. | |
| 6,809,063 B2 | 10/2004 | Scranton et al. | |
| 7,159,655 B2 * | 1/2007 | Ke ......................... C09K 8/528 166/279 |
| 7,398,824 B1 | 7/2008 | Wang et al. | |
| 7,563,424 B2 | 7/2009 | Scranton et al. | |
| 2005/0056567 A1 | 3/2005 | Scranton et al. | |
| 2006/0081499 A1 * | 4/2006 | Khare ..................... B01J 20/06 208/15 |
| 2007/0109379 A1 | 5/2007 | Sekiya | |
| 2013/0272943 A1 | 10/2013 | Braga | |

OTHER PUBLICATIONS

American Chemical Society, "Group notation revised in periodic table," Chemical Engineering News, vol. 63, No. 5, Feb. 4, 1985, pp. 26-27.
SDS Spray Drying "Why Use a Spray Dryer for Your Drying Application?", Jul. 5, 2008.
International Search Report and Written Opinion for the equivalent International patent application PCT/US2011/067887 dated May 1, 2012.
International Preliminary Report on Patentability for the equivalent International patent application PCT/US2011/067887 dated Jul. 18, 2013.
Office Action for the equivalent Mexican patent application MX/a/2013/007767 dated May 28, 2014.
Office Action for the equivalent Sandi Arabian patent application 112330140 dated May 28, 2014.
Extended Search Report for the equivalent European patent application 11854567.2 dated Oct. 20, 2017.
Search Report for the equivalent Brazilian patent application 112013017236-3 dated Dec. 3, 2018.

\* cited by examiner

*Primary Examiner* — Haytham Soliman

(57) ABSTRACT

Disclosed herein is an agglomeration-resistant desulfurizing product for removing contaminants from a fluid stream. The agglomeration-resistant desulfurizing product comprising a metal oxide composition for reacting with contaminants and a polymeric crystallization inhibitor for reducing the agglomeration of the desulfurizing product resulting from using the desulfurizing product. A method to produce the agglomeration-resistant desulfurizing product and a method to treat a fluid stream is also disclosed.

16 Claims, No Drawings

AGGLOMERATION-RESISTANT DESULFURIZING PRODUCT

CROSS-REFERENCE TO RELATED APPLICATIONS

This is a divisional application of co-pending U.S. patent application Ser. No. 13/976,389 filed on Jun. 26, 2013 under PCT National Phase for PCT/US2011/067887, and entitled "Agglomeration-Resistant Desulfurizing Product," which is claiming the benefit of U.S. Provisional Application No. 61/429,601, filed Jan. 4, 2011, and is incorporated herein by reference in its entirety.

FIELD OF INVENTION

The present invention relates to a metal oxide composition for use in removing contaminants, including sulfur compounds, from fluids, methods for making such a metal oxide composition, and methods for removing contaminants from a fluid stream using such a metal oxide composition.

BACKGROUND OF INVENTION

It is well known to use metal oxides, particularly iron oxide (FexOy) in a reactor bed to remove contaminants, typically sulfur compounds, especially hydrogen sulfide ($H_2S$), from fluids, typically gas streams. Sulfur compounds are removed from fluids because they are known contaminants, which potentially make gas streams or other fluids unsalable. Gas that contains too much sulfur is known as sour gas. As such, in the gas industry, as well as related industries, it is considered necessary to remove sulfur compounds from fluids, including gas. Note that these fluids are typically devoid of oxygen (it is known that oxygen can increase reactivity between a metal oxide composition and contaminants). For this reason, there is a need for products that remove sulfur compounds from fluids efficiently and cost effectively. It is further desired to have a method or composition that does not require the inclusion of activating agents, such as oxygen.

Sulfur removal on a level that treats up to millions of cubic feet of gas per day or on an industrial scale, typically requires the use of large reactor beds filled with a desulfurizing product. In one embodiment, such desulfurizing products comprise iron oxide on a carrier such as montmorillonite or wood chips. In order to have a sufficient bed life, large amounts of desulfurizing product are used. One way to increase the amount of sulfur held in a reactor vessel is to use another desulfurizing product embodiment in which the metal oxide is pelletized or compressed thereby increasing the amount of metal oxide per unit of desulfurizing product volume. By way of comparison, a carrier-type desulfurizing product typically comprises approximately 20% by weight metal oxide and 80% by weight of carrier whereas a pelletized-type desulfurizing product typically comprises from about 80% to about 99% metal oxide and about 1% to about 20% by weight binder.

Using such conventional desulfurizing products to remove sulfur contaminants from a fluid stream (e.g., natural gas, flu gas, and/or the like) results in the chemical reaction of the iron oxide to iron sulfide until such time as the desulfurizing product in a reactor vessel, wherein the contact between the desulfurizing product and the fluid stream previously occurred, is effectively "spent". The spent desulfurizing product is then removed from the reaction vessel but doing so is typically difficult because during use the desulfurizing product particles tend to agglomerate. In fact, it is typical for essentially all of the spent desulfurizing product in a reaction vessel to have become a unified mass. Often, removal of the spent desulfurizing product from a reaction vessel requires physical force such as by jackhammer, and/or by contacting the spent composition with high pressure water jets having a pressure on the order of 3,000 to 10,000 psi. Such processes, typically result in undesirably long downtimes and costs in terms of man-hours and equipment.

Thus, a need still exists for a desulfurizing product that tends not to agglomerate during use such that when spent its removal from a reaction vessel does not require such physical force.

SUMMARY OF INVENTION

The present invention is directed to agglomeration-resistant desulfurizing product for removing contaminants from a fluid stream. The desulfurizing product comprises:

(a) a metal oxide composition that comprises a primary component, wherein the primary component comprises at least one metal oxide of the formula MexOy.(H20)z, wherein Me is selected from groups 4-12 of the periodic table of elements, 0 is oxygen; 1 s x s 3; 1:S y s 4, and 0:S z s 1O; and (b) a polymeric crystallization inhibitor.

Additionally, the present invention is directed to a method for producing an agglomeration-resistant desulfurizing product for removing contaminants from a fluid stream. The method comprises adhering a polymeric crystallization inhibitor to at least a surface of a desulfurizing product thereby resulting in the agglomeration-resistant desulfurizing product, wherein the primary component comprises at least one metal oxide of the formula MexOy.($H_2O$)z, wherein Me is selected from groups 4-12 of the periodic table of elements, 0 is oxygen; 1 s; x s; 3; 1 s; y s; 4, and 0 s; z s; 10.

Further, the present invention is directed to a method for removing contaminants from a fluid stream. The method comprises contacting the fluid stream with an agglomeration-resistant desulfurizing product that comprises:

(a) a metal oxide composition that comprises a primary component, wherein the primary component comprises at least one metal oxide of the formula MexOy.(H20)z, wherein Me is selected from groups 4-12 of the periodic table of elements, 0 is oxygen; 1 s; x s; 3; 1 s; y s; 4, and 0 s; z s; 1O; and (b) a polymeric crystallization inhibitor;

wherein the fluid stream is contacted with the agglomeration-resistant desulfurizing product for a period of time, at a pressure, and at a temperature sufficient to react at least a portion of the contaminants in the fluid stream with the metal oxide composition thereby removing contaminants from the fluid stream.

DETAILED DESCRIPTION

Introduction

The present invention is directed to an agglomeration-resistant desulfurizing product that is suitable for use in the removal of sulfur contaminants (e.g., $H_2S$) from a fluid stream (e.g., natural gas, flu gas, and/or the like) that tends to not agglomerate (i.e., not gather into a mass) during such use. To that end, it has been unexpectedly discovered that including a polymeric crystallization inhibitor in a desulfurizing product causes the desulfurizing product to resist or eliminate the agglomeration thereof during its use to remove sulfur contaminants from a fluid stream.

In addition to the polymeric crystallization inhibitor, the desulfurizing product comprises a metal oxide composition for effecting the removal for sulfur contaminants from a fluid stream, wherein the metal oxide composition comprises a primary component and, optionally, an activator component for increasing the reactivity of the primary component and, in particular, will cause the primary component to more readily react with sulfur compounds and/or other contaminants in the fluid stream. The primary component and the activator component may be described generally as comprising one or more metal oxides, hydrated forms of such metal oxides, or combinations thereof. The present invention is also directed to a method for making such an agglomeration-resistant desulfurizing product. Still further, the present invention is directed to a method of using such an agglomeration-resistant desulfurizing product to remove sulfur-containing compounds from fluids that are contacted with the desulfurizing product.

Metal Oxide Composition

As disclosed above, the metal oxide composition comprises a primary component and, optionally, an activator component, each of which comprises one or more metal oxides, hydrated forms of such metal oxides, or combinations thereof. The primary component and the activator component are typically in particulate form. In one embodiment, the particles have a particle size in the range of about 0.1 microns to about 100 microns. In another embodiment, the particle size is in the range of about 1.5 microns to about 50 microns. For purposes herein, unless indicated to the contrary, all references to particle size are intended to be an average particle size, wherein the size of a particle is the greatest cross-sectional distance of a particle. Due to the particulate nature of the primary component and activator component, if present, pelletized or compressed desulfurizing product tend to be porous and have significantly more total surface area than would substantially non-porous or "solid" pellets of such metal oxides—for example, at least about 25 times more surface area.

Primary Component

The primary component comprises at least one metal oxide of the formula: $Me_xO_y\cdot(H_2O)_z$, wherein Me is selected from groups 4-12 of the periodic table of elements, O is oxygen, x is greater than or equal to 1 and less than or equal to 3; y is greater than or equal to 1 and less than or equal to 4, and z is 0 to 10. As used herein, the reference to periodic table groups are as set forth in the Chemical and Engineering News, 63(5), 27 (1985). For sake of completeness, the foregoing Me elements include Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, and Hg.

Advantageously it has been found that utilizing one or more of the foregoing metal oxides tends to allow for greater retention of sulfur compounds from fluid streams than other metal oxides. In fact, it has been observed that desulfurizing products comprising embodiments of the foregoing metal oxides are able to retain an average amount of sulfur equal to at least 10% based on the total weight of compressed-type desulfurizing products.

In an embodiment, the primary component comprises $Fe_aO_b$, ZnO, hydrated forms of $Fe_aO_b$, hydrated forms of ZnO, or combinations thereof, wherein a is greater than or equal to 1 and less than or equal to 3, and b is greater than or equal to 1 and less than or equal to 4. In another embodiment, the primary component comprises FeO, Fe2O3, Fe3O4, Fe(OH)z, Fe(OH)h Fe(OH)z, FeOOH, Fe5HOa, hydrates thereof, or a combination thereof. In yet another embodiment, the primary component comprises $Fe_2O_3$, $Fe_3O_4$, hydrates thereof, or a combination thereof.

In general, it is typically desirable for desulfurizing product to comprise a substantial amount of the primary component. For example, the desulfurizing product may comprise the primary component at an amount that is greater than or equal to about 20 wt %, 30 wt %, 40 wt %, 50 wt %, 60 wt %, 70 wt %, 80 wt %, or 90 wt % of total weight of the desulfurizing product. Typically, supported desulfurizing products comprise the primary component at an amount that is in the range of about 20 wt % to about 45 wt %. In contrast, compressed desulfurizing products, because they do not comprise supports, typically comprise more of the primary component such as, for example, at an amount that is greater than or equal to about 80 wt %.

Activator Component

As mentioned above, the activator component is an optional constituent for increasing the reactivity of the primary component with sulfur compounds and comprises one or more metal oxides, hydrated forms of such metal oxides, or combinations thereof that are different from the metal oxide(s) of the primary component. The activator component metal oxides are selected from the group consisting of a copper oxides ($Cu_2O$ and/or CuO), silver oxide ($Ag_2O$), gold oxide ($Au_2O_3$), platinum oxide (PtO2), cadmium oxide (CdO), nickel oxides (NiO2 and/or Ni2O3), palladium oxide (PdO), lead oxides (PbO, Pb3O4, PbO2, Pb2O3, and/or Pb12O19), mercury oxide (HgO), tin oxides (SnO and/or SnO2), cobalt oxides (CoO, $Co_2O_3$, and/or $Co_3O_4$), manganese oxides (MnO, Mn3O4, Mn2O3, MnO2, and/or Mn2O1), aluminum oxide ($Al_2O_3$), and combinations thereof. The desulfurizing product may comprise the activator component at an amount that is in the range of about 0.5 wt % to about 5 wt % of the primary component.

As mentioned above, the addition of the activator component is intended to increase the reactivity of the metal oxide composition and, in particular, will cause the composition to more readily react with sulfur compounds and/or other contaminants in the fluid stream. Without being held to a particular theory, it is believed that this is typically accomplished by selecting an activator metal oxide that has a higher electro-potential than a primary metal oxide. More particularly, primary component metal oxides comprising iron and/or zinc have an electronegative potential, meaning the potential is on the active or anodic end of the Emf series, with the active end relating to metals which tend to corrode. More "noble" metals, such as copper, have an electropositive potential, meaning the potential is on the noble or cathodic end of the Emf series and generally do not corrode as readily as anodic metals. The Emf series is a listing of elements according to their standard electrode potential. When two dissimilar metals, a noble metal and an active metal, are combined a galvanic cell is formed, which will result in galvanic corrosion. Because of the foregoing, primary component metal oxides when coupled with activator component metal oxides tend to have increased corrosion which tends to increase the reactivity with sulfur compounds. For example, when copper oxide (activator component) is added to iron oxide (primary component), it is believed that a galvanic cell is formed which causes the iron oxide to corrode faster and thus be more reactive with various sulfur species. What this means is that it is believed that increasing the electro-potential difference between a primary component metal oxide and an activator component metal oxide typically increases the reactivity of the primary component metal oxide with various sulfur species. Most of this information, as well as, the Emf series were discussed and disclosed in the "Basic Corrosion Course" offered by the National Association of Corrosion Engineers in October of 1978.

In an embodiment, the primary component is one or more iron oxides, hydrated forms thereof, or combinations thereof and the activator component is one or more copper oxides, hydrated forms thereof, or combinations thereof. It has been observed that the increased reactivity of the iron oxide caused by the copper oxide reduced the sulfur reaction rate by half or more, which beneficially may be exploited to allow for the use of smaller reaction vessels. Using copper oxides may be a desirable choice for inclusion in the activator component because it is not considered to result in the formation of hazardous compounds as specified by the U.S. Environmental Protection Agency.

Polymeric Crystallization Inhibitor

The agglomeration-resistant desulfurizing product of the present invention also comprises a polymeric crystallization inhibitor that effectively inhibits, controls, or disrupt formations of metal sulfides (e.g., zinc sulfide, manganese sulfide, iron sulfide) and/or other contaminants which form upon contact of the primary metal oxide composition with sulfur-containing compounds present in the fluid stream. The polymeric crystallization inhibitor may be present in the agglomeration-resistant desulfurizing product at a concentration from about 1 part per million (ppm) by weight to about 10 wt %, based on the total weight of the metal oxide composition. Preferably, the concentration of polymeric crystallization inhibitor is greater than or equal to about 10 ppm by weight (based on the total weight of the metal oxide composition), more preferably greater than or equal to about 50 ppm by weight, still more preferably greater than or equal to about 100 ppm by weight, more preferably greater than or equal to about 500 ppm by weight, still even more preferably greater than or equal to about 1000 ppm by weight.

The term polymer or polymeric refers to and includes homopolymers, copolymers, interpolymers, terpolymers, etc. Likewise, a copolymer may refer to a polymer comprising at least two monomers, optionally with other monomers. When a polymer is referred to as comprising a monomer, the monomer is present in the polymer in the polymerized form of the monomer or in the derivative form of the monomer. Further, unless otherwise stated, functional groups of a polymer may be obtained through polymerization of moieties comprising a particular functional group, and/or the polymers may be functionalized polymers via grafting or other processes know to one of skill in the art. Polymers may also refer to blends of various polymers to produce a particular result.

In an embodiment, the polymeric crystallization inhibitor comprises a salt of acrylamido-methyl propane sulfonate/acrylic acid copolymer (AMPS/AA); a phosphonated maleic copolymer (PHOS/MA); a salt of polymaleic acid/acrylic acid/acrylamido-methyl propane sulfonate terpolymers (PMA/AMPS); a copolymer comprising an acrylamide moiety, a quaternary ammonium moiety, a quaternary ammonium salt moiety, an acrylate moiety, an acrylic acid moiety, or combination thereof; or a combination thereof. Such polymeric crystallization inhibitors typically have an average molecular weight of the polymeric crystallization inhibitor that in the range of about 500,000 to about 5,000,000.

In an embodiment, the polymeric crystallization inhibitor comprises a polymer comprising an acrylamide moiety, a quaternary ammonium salt moiety, an acrylate moiety, an acrylic acid moiety, or a combination thereof. In another embodiment, the polymeric crystallization inhibitor is a polymer comprising an acrylamide moiety, a quaternary ammonium salt moiety, an acrylate moiety, an acrylic acid moiety, or a combination thereof.

Acrylamide

In an embodiment, an acrylamide moiety may be acrylamide, (meth)acrylamide, diacetone acrylamide, N-methylolacrylamide, and combinations thereof.

Quaternary Ammonium Salt

In an embodiment, a quaternary ammonium salt may be those obtained by cationizing a (a) tertiary-amino-containing monomer such as N,N-dimethylaminoethyl (meth)acrylate, N,N-diethylaminoethyl (meth)acrylate, N,N-dimethylaminopropyl (meth)acrylate, N,N-diethylaminopropyl (meth)acrylate, N,N-dimethylaminoethyl (meth)acrylamide, N,N-diethylaminoethyl (meth)acrylamide, N,N-dimethylaminopropyl (meth)acrylamide, N,N-diethylaminopropyl (meth)acrylamide, p-dimethylaminomethylstyrene, p-dimethylaminoethylstyrene, p-diethylaminomethylstyrene or p-diethylaminoethylstyrene with (b) a cationizing agent, for example, (i) a halogenated alkyl such as methyl chloride, methyl bromide or methyl iodide, (ii) a dialkylsulfuric acid such as dimethylsulf uric acid, (iii) an epichlorohydrin-added tertiary amine mineral acid salt such as N-(3-chloro-2-hydroxypropyl)-N,N,N-tri methylammonium chloride, (iv) an inorganic salt such as hydrochloric acid, hydrobromic acid, sulfuric acid or phosphoric acid, or (v) a carboxylic acid such as formic acid, acetic acid, or propionic acid.

In an embodiment of the present invention, a quaternary ammonium salt may be selected from the group consisting of dialkyldiallylammonium salts, polyvinyl benzyl trialkyl ammonium salts, salts of polyepichlorohydrin quaternized with trialkyl amine, polymethacrylamidoalkyltrialkyl ammonium salts, polymethacryloyloxyalkyltrialkyl ammonium salts, and polymethacryloyloxyalkyl dialkyl hydroxyalkyl ammonium salt, wherein the alkyl is preferably a C1-C$_3$ alkyl group. Preferred are polyvinyl benzyl trimethyl ammonium salts, salts of polyepichlorohydrin quaternized with trimethyl amine, polymethacrylamidopropyltrimethyl ammonium salts, polymethaoryloyloxyethyltrimethyl ammonium salts, and polymethacryloyloxyethyl dimethyl hydroxyethyl ammonium salt.

In an embodiment, a quaternary ammonium salt may be selected from the group consisting of dimethyldiallylammonium salts (e.g., dimethyldiallylammonium chloride) and acrylamide or acrylic acid derivatives thereof such as acrylamidoethyltrimethylammonium chloride, acrylamide/di methylaminoethyl acrylate methyl chloride quaternary ammonium salt, poly(acrylamide/dimethylaminoethyl methacrylate methyl chloride quaternary ammonium salt), poly(acrylamide/diallyldimethyl ammonium chloride), poly (dimethylaminoethyl acrylate methyl chloride quaternary ammonium salt), and poly(dimethylaminoethyl methacrylate methyl chloride quaternary ammonium salt).

Copolymers

In an embodiment, the polymeric crystallization inhibitor comprises an acrylamide moiety-quaternary ammonium salt moiety copolymer. In another embodiment, the polymeric crystallization inhibitor is an acrylamide moiety-quaternary ammonium salt moiety copolymer. In such an embodiments, the copolymer generally has a molar ratio of acrylamide moiety to quaternary ammonium salt moiety that is in the range of about 1:5 to about 5:1. In a preferred embodiment, the quaternary ammonium salt moiety is a diallyldimethyl-ammonium salt and the copolymer has a molar ratio of acrylamide moiety to diallyldimethylammonium salt that is in the range of about 1:2 to about 2:1. Examples of such copolymers include the water-soluble polymers known as Polyquaternium-7 (in which the diallyldimethylammonium salt is diallyldimethylammonium chloride). In a preferred embodiment, the polymeric crystal inhibitor comprises poly (acrylamide-co-diallyldi methylammonium chloride). In a preferred embodiment, the polymeric crystal inhibitor is poly(acrylamide-co-diallyldimethylammonium chloride).

In an embodiment, the polymeric crystallization inhibitor comprises an acrylic acid moiety-acrylamide moiety-quaternary ammonium salt moiety copolymer. In another embodiment, the polymeric crystallization inhibitor is an acrylic acid moiety-acrylamide moiety-quaternary ammonium salt moiety copolymer. Examples of suitable acrylic acid moieties include acrylic acid, (meth)acrylic acid, and salts thereof. Examples of such salts include alkali salts, preferably sodium salts. The molar ratio of the acrylic acid moiety to the acrylamide moiety usually in the range of about 2:1 to about 1:3 and preferably is about 1:1. The molar ratio of the acrylamide moiety to the quaternary ammonium salt moiety is usually in the range of about 1:5 to about 5:1. In a preferred embodiment, the molar ratio of the acrylic acid moiety to the quaternary ammonium salt moiety to the acrylamide moiety is in the range of about 1:2:1 to about 1:1:1.

In such copolymer embodiments, the polymeric crystallization inhibitor may contain either random units of acrylamide, diallyldimethylammonium salt and, optionally, acrylic acid. Alternatively, the polymers suitable for use herein may comprise block polymers containing block segments of the various monomer(s).

Pelletized Desulfurizing Product

In an embodiment, the desulfurizing product is a pelletized- or compressed-type product that comprises the metal oxide composition, the polymeric crystallization inhibitor, and a binder, which may comprise one or more organic binder compounds, one or more inorganic binder compounds, or combinations thereof. In such an embodiment, at least about 90 wt % of the compressed desulfurizing product pellets have a particle size in the range of about 0.1 mm to about 200 mm, preferably in the range of about 0.1 mm to about 20 mm, and more preferably in the range of about 0.5 mm to about 5 mm.

Binder

In an embodiment, the metal oxide composition comprises a binder. If present, the binder is at an amount that is in the range of about 0.5 wt % to about 80 wt % based on the total weight of the desulfurizing product. In an embodiment, the binder is present at an amount that is in the range of about 1 wt % to about 20 wt % of the desulfurizing product. Preferably, the binder is at an amount that is in the range of about 1 to about 10 wt % of the desulfurizing product. More preferably, the binder is at an amount that is in the range of about 1 wt % to about 5 wt % of the desulfurizing product.

In an embodiment, the binder is selected such that it does not impact the reactivity of the metal oxide composition with the contaminants in the fluid stream (e.g., hydrogen sulfide and other sulfur compounds). It is hypothesized that it is desirable to select a binder that allows for pellets of compressed desulfurizing product to have a significant amount of porosity or transfer capability, which allows reasonable access to the metal oxide composition in the interior of compressed pellets. Preferably, the binder and its amount are selected such that compressed pellets are able to retain an amount of sulfur equal to at least 10 wt % based on the total weight of the pellets before being exposed to sulfur-containing fluids. More preferably, the pellets are able to retain an amount of sulfur equal to at least 20 wt % based on the total weight of the pellets before being exposed to sulfur-containing fluids. Still more preferably, the pellets are able to retain an amount of sulfur equal to at least 30 wt % based on the total weight of the pellets before being exposed to sulfur-containing fluids.

In an embodiment, the binder may be relatively water insoluble. It is believed that this property prevents substantial dissolution of the binder by water during use, because the desulfurizing product described herein is typically used in a moist environment (i.e., in the presence of water). If water does dissolve the binder, the pellets can potentially degrade which may reduce their effectiveness. Any of a variety of binders may be used. Suitable examples include cellulose, starch, carboxymethylcellulose, and mixtures thereof. Insoluble binders such as water insoluble cellulose may be used in place of or in conjunction with water soluble binders. In one embodiment, the binder is water insoluble and it is at an amount that is in the range of about 5 wt % to about 15 wt % based on the total weight of the desulfurizing product. In an embodiment, a binder comprised of nearly 100% water insoluble cellulose is most preferred. Additionally, it is desirable to select a binder that absorbs a relatively limited amount of water, for example, less than about 60% by weight of water based on the weight of the binder. An example of a suitable commercially available binder is TECHNOCEL™ 202, manufactured by the Cellulose Filler Factory Corp., Chestertown, Md. Examples of known suitable inorganic binders include phosphate binder compounds, silicate binder compounds (e.g., sodium silicate), aluminate binder compounds (e.g., calcium aluminates}, sulfate binder compounds (e.g., calcium sulfates), and borate binder compounds (e.g., colemanite and borax pentahydrate).

Manufacture

Pelletized or compressed desulfurizing product may be produced by a method generally described as comprising the steps of forming a mixture comprising metal oxide composition particles and a binder and compressing the mixture at a pressure, at a temperature, and for a period of time sufficient to produce a compressed product, which may be of a size appropriate for use or which may subjected to additional physical force to break the compressed product into smaller pieces. To be clear, an entity forming a compressed product need not perform the foregoing mixing step; a different entity may perform the mixing. Preferably, the mixing of the metal oxide composition particles and binder is sufficient to thoroughly mix the constituents such that mixture is considered to be homogeneous. Any appropriate equipment and/or method of mixing the constituents may be used.

Compression of constituents to produce a pelletized or compressed desulfurizing product may be achieved in a variety of ways. Examples of suitable devices include a compactor or an extruder. If desulfurizing product pellets having the desired final particle size are produced directly by a particular device or process, it is not necessary to break them apart and/or screen them. However, the extruded and/or compacted composition may undergo further mastication, and/or size classification to produce a plurality of pellets having a desired size or range of sizes. Standard methods in the industry for forming pellets or particles out of compressed material may be used. In general, smaller particles tend to increase the amount of sulfur that may be removed for a given amount of desulfurizing product but there is a limit to this—simply using metal oxide composition powders in a reaction vessel would generally be considered as having insufficient reactivity because the powder will most likely not allow for sufficient flow of fluids within a reaction vessel.

In an embodiment in which extrusion is utilized in the manufacture of compressed desulfurizing product it may be desirable to dry the compressed product so as to reduce moisture and/or to remove other solvents used in the manufacturing process. It is believed that drying the pellets tends to increase and/or maximize their crush strength. Any appropriate process and/or equipment for drying may be used. It is has been found that it is desirable for the compressed product to have a total water content that is less than 10% by weight and, more preferably, less than 3% by weight. The temperature used to dry the particles is preferably one that does not break down or incinerate the binder. It is believed that the drying temperature is preferably no greater than 150° C. and more preferably no greater than 90° C. Suitable dryers include rotary dryers, belt dryers, fluid bed dryers, and the like, with a rotary dryer being preferred.

In an embodiment, the compressed product may be marumerized to increase the hardness and abrasion as measured by the percentage of fines in the treated extruded metal oxide composition. Any of a variety of marumerizers may be used in the present invention. Rotary drying may eliminate the need for a marumerizer.

After larger pieces of compressed product are broken into pieces, the pieces are processed through a SC?reener or other means for particle size classification. Oversize pieces may be discharged into a hammer mill or the like, and then returned to the screener. The fines may be recycled back into the production process.

It should be noted that, although a variety of devices and methods may be used for forming desulfurizing product pellets, it is desirable to select the same so as to avoid significantly negatively impacting the reactivity of the pellets with sulfur in a fluid stream. It is also desirable to select ingredients, equipment, and processes that impart compressed desulfurizing product with physical properties adequate for their intended use. For example, it may be desirable for compressed desulfurizing product pellets to be of a form or shape that is appropriate for use in a particular reaction vessel. Further, it may be desirable for compressed desulfurizing product pellets have certain physical properties such as a minimum crush strength. In certain embodiments, the compressed desulfurizing product pellets have a crush strength that is greater than or equal to about 1 kg, preferably greater than or equal to about 2 kg, more preferably greater than or equal to about 3 kg, and still more preferably greater than or equal to about 3.5 kg.

To be clear, references to the desulfurizing product being "pellets", "pelletized", and/or "compressed" are not intended to limit the configuration, form, or shape thereof and may include configurations, forms, or shapes such as pellets, tablets, pastilles, rings, spheres, ribbed versions of the foregoing, extrusions, particles, particulate, and/or granules.

Supported Desulfurizing Product

In one embodiment of the present invention, the desulfurizing product is a carrier-type product that comprises the metal oxide composition, the polymeric crystallization inhibitor, and a carrier. As noted above, such a carrier may be wood chips but is preferably porous mineral carrier, such as porous clay-like material such as calcined montmorillonite (typically calcined at about 400° F. or about 205° C.). Typically, calcined montmorillonite has a dry weight that is in the range of about 35 to about 45 pounds per cubic foot (about 0.45 to 0.59 kg/m$^3$) and preferably at about 42 pounds per cubic foot (about 0.55 kg/m$^3$). As with compressed materials, it is desirable to select appropriately sized carrier material. In the case of mineral material such as calcined montmorillonite it is preferred for no more than about 3% by weight of it to pass through a 30 mesh screen. Preferably, the amount of metal oxide is typically in the range of about 15 to about 35 pounds per cubic foot (about 0.20 to about 0.46 kg/m$^3$) of carrier. That said, if oxygen is to be present in the reaction vessel adequate removal of sulfur compounds may be accomplished with a reduce amount of metal oxide composition such as about 6 to about 15 pounds per cubic foot (about to about 0.08 to about 0.20 kg/m$^3$) of carrier.

Typically, the metal oxide composition is deposited, adhered, or adsorbed to the carrier by wetting the carrier and contacting the wetted carrier and the metal oxide composition. More specifically, a process depositing, adhering, or adsorbing a metal oxide composition may involve placing a quantity of the carrier in a rotary mixer and while rotating the carrier therein spraying water into the mixer. Typically, the amount of water is slightly less than one-third of the weight of the mineral. The water is added over a period of time that is often as long as about 30 minutes. Then the metal oxide composition particles are added while the mixing continues for a period that, again, is often as long as 30 minutes. The moisture causes the metal oxide composition particles to adhere to the surfaces and interstices of the carrier in such a manner so as to generally avoid their clumping together. A small amount of sodium sulfite may also be added to the mixture out of the belief that it "cleans" the surfaces of the mineral and promotes the adherence of moisture and the metal oxide composition.

Accordingly, in an embodiment, the desulfurizing product may comprise a supported metal oxide composition. Commercially available examples of suitable supported metal oxides that may be combined with a polymeric crystallization inhibitor as disclosed herein include the family of products sold under the brandname SU LFATREAT™ (Sulfatreat, St. Louis, Mo.).

Another method for forming supported desulfurizing product, which is particularly suited for applications in which the carrier is wood chips, is to form a solution, dispersion, or mixture comprising the metal oxide composition and contacting the carriers (e.g., wood chips) with the same so that the metal oxide composition is deposited, adhered, adsorbed, or absorbed thereto.

Inclusion of the Polymeric Crystallization Inhibitor

It is to be noted that the polymeric crystallization inhibitor may be included in a desulfurizing product in a variety of manners and/or opportunities in the manufacturing process for either compressed or supported desulfurizing product. For example, the polymeric crystallization inhibitor may be included with the metal oxide composition and binder in the forming of the mixture to be compressed. Alternatively, the polymeric crystallization inhibitor may be mixed with the metal oxide composition and then the mixture is contacted with carriers in accordance with the foregoing to form supported product. The polymeric crystallization inhibitor may be added as a solid or it may be dissolved or dispersed in a solvent prior to being contacted with the metal oxide composition particles. The binder may also be dissolved or dispersed in a solvent and such solvent may be the same as that of polymeric crystallization inhibitor. Suitable solvents include water, alcohols, and/or various organic solvents suitable for use with a particular binder or polymeric crystallization inhibitor. Aqueous solvents are preferred for use herein.

In an alternative embodiment, the polymeric crystallization inhibitor may be absorbed or adsorbed onto the metal oxide composition particles prior to being mixed with binder. In another alternative, the polymeric crystallization inhibitor may be absorbed or adsorbed onto a compressed product or a supported product. For example, the polymeric crystallization inhibitor may be dissolved or dispersed in a solvent and the compressed product or a supported product may be contacted (e.g., by spraying) with the solution/dispersion. In such an embodiment, it is believed that drying the compressed product or supported product with polymeric crystallization inhibitor sprayed thereon is desirable. In still another embodiment, a compressed product or supported product may be contacted with the polymeric crystallization inhibitor as the product is being loaded into the vessel in which the product will be packaged, transported, or utilized to remove contaminants from a fluid stream. For example, the polymeric crystallization inhibitor may be sprayed onto the compressed or supported product as it is being loaded into a reaction vessel. In still another embodiment, a compressed or supported product may be put in place for use, and subsequently contacted with the polymeric crystallization inhibitor, for example, in the form of an aerosol, liquid, or the like, to produce the agglomeration-resistant desulfurizing product as disclosed herein.

It is to be noted that metal oxides, activators, and binders suitable for use in the present invention are generally known in the art, as are methods to produce and compressed and supported desulfurizing products. Examples include those disclosed in U.S. Pat. Nos. 5,264,194; 5,320,992; 5,632,931; 6,228,802; 6,664,210; 6,809,063; and 7,563,424, all of which are fully incorporated by reference herein.

Removing Sulfur from a Fluid

The desulfurizing product may be placed in a reactor vessel so as to be contacted with a contaminated fluid stream, preferably contaminated with sulfur compounds. The fluids may include gases, liquids, and combinations thereof. It is most preferred to remove sulfur compounds from contaminated gas streams, such as propane and hydrocarbon gases. The gas is preferably contacted with water to produce a wet gas prior to contacting with the desulfurizing product.

In an embodiment, a method for removing contaminants from a fluid stream comprises the steps of: contacting the fluid stream with an aqueous solution to produce a wet fluid stream; and contacting the wet fluid stream with an agglomeration-resistant desulfurizing product as described herein for a period of time, at a pressure, and at a temperature sufficient to react at least a portion of the contaminants in the fluid stream with the metal oxide composition thereby removing said reacted contaminants from said wet fluid stream.

Among the sulfur compounds that can be removed using the present desulfurizing product are hydrogen sulfide ($H_2S$), carbonyl sulfide (COS), carbon disulfide ($CS_2$), Dimethyl Sulfide (OMS), and mercaptans, such as Methyl Mercaptan (MeSH), Ethyl Mercaptan (EtSH), and Propyl Mercaptan (PrSH). It should be noted that it is likely that other contaminants found in fluids, especially hydrocarbon gas, may be removed by the metal oxide composition. These sulfur compounds may be removed under ambient conditions, more particularly, when the temperature is equal to or less than 70° C., with about 200° C. being the highest preferred temperature. Any pressure appropriate for the reactor vessel may be used. Additionally, it is typically preferred for the fluid stream to be passed over the desulfurizing product pellets at a velocity equal to at least 0.6 feet per minute in gases and 0.1 feet per minute for liquids. In an embodiment, compressed-type desulfurizing product may retain an average amount of sulfur equal to at least 10 wt % and, preferably, 30 wt % based on the weight of the compressed desulfurizing product pellets, and have an $H_2S$ holding capacity equal to at least 0.27 kg of $H_2S$ per kg of compressed desulfurizing product pellets.

EXAMPLES

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims that follow.

Example 1

In a first example, 1.215 kg (810 ml) of SULFATREAT XLP™ material were sprayed in the laboratory with 0.15 g (150 ml solution of 0.1% by wt) poly (acrylamidecodiallyldimethylammonium chloride) in water to produce a treated composition having 0.012% (120 ppm) of the polymeric crystallization inhibitor. The treated composition was then exposed to HzS according to standard laboratory conditions.

This exposure involved flowing nitrogen gas with 3000 ppmv $H_2S$ through a 2 inch ID by 3 inch long column at a flow rate of 0.27 liters per minute and a pressure of 5 psig. The reactivity/capacity of the treated composition was not affected by the polymeric crystallization inhibitor. Comparison of the sulfur loading capacity showed no reduction. For the untreated media the % sulfur loading was 28.6%. For the sample treated with the polymeric crystallization inhibitor, the % sulfur loading was 30.0%. Within the experimental error of the test, these results are considered essentially identical. However, removal of the spent composition from the test column was notably easier as compared to previous samples that did not incorporate the polymeric crystallization inhibitor. Generally, in order to remove the spent sample from the vessel, drilling or scrapping with a screwdriver is necessary. The media then comes out of the column in chunks. For the sample treated with the polymeric crystallization inhibitor, the spent sample was nearly a free flowing solid with only slight agitation necessary for complete removal.

An experimental example of the desulfurizing product according to an embodiment of the instant disclosure was prepared by mixing 2730 pounds (1241 kg) of iron oxide with 150 pounds (68 kg) of TECHNOCEL 202 cellulose. Ten gallons (2.64 liters) of a 0.45 weight percent solution of the polymeric crystallization inhibitor, poly (acrylamide-co-diallyldimethylammonium chloride) (Sigma-Aldrich Chemical Co., St, Louis, Mo.) was then added to the mix. The 0.45% solution was made by mixing 3.75 pounds (1.7 kg) of 10% Poly (Acrylamide-co-diallyldimethylammonium chloride with 79.55 pounds (36.16 kg) of water. The 10% solution of the polymeric crystallization inhibitor had a viscosity between 9,000 and 25,000 cP (25° C., Brookfield). The example was then processed using a compactor to form briquettes that were broken down and finally sized between a 5 mesh screen and a 30 mesh screen.

This experimental example was tested in the laboratory using the method described above. The % sulfur loading was 25.5%, again showing no reduction of performance, within the experimental error of the test method.

7,500 pounds (3409 kg) of the experimental example were loaded into a 4 ft by 10 ft bed (1.22 m×3.05 m) in a production facility to remove sulfur contaminants from natural gas. After the experimental example was spent, the spent material was removed according to normal practices in the art. For comparison, the previous batch of the same material without the polymeric crystallization inhibitor required the use of a 10,000 psi (6.894 E+7 Pa) water blaster and took 12 hours to remove by an experienced removal crew, as is standard in the art. The experimental example was removed in less than 2 hours using a 3,500 psi (2.413 E+7 Pa) water blaster. No reduction in the amount of sulfur removed from the fluid stream relative to comparative examples was observed when using the desulfurizing product with the polymeric crystallization inhibitor.

32,000 pounds (14,545 kg) of the experimental example were loaded into a vessel to produce a 66 inch (167.64 cm) by 25 ft (7.62 m) bed and utilized to remove sulfur contaminants from natural gas. The spent material was subsequently removed in two portions. The first half of the vessel was cleaned using 3,500 psi (2.413 E+7 Pa) water blasters for 6 hours. The second half of the vessel was cleaned using 10,000 psi (6.894 E+7 Pa) water blasters for less than 2 hours. For comparison, the same vessel using the same material absent the polymeric crystallization inhibitor required at least 3 days to clean out using 10,000 psi (6.894 E+7 Pa) and jack hammers. No reduction in the amount of sulfur removed from the fluid stream relative to comparative examples was observed when using the desulfurizing product with the polymeric crystallization inhibitor.

Example 2

For these tests, 150 g (100 ml) of SULFATREAT XLP™ material were sprayed in the laboratory with 0.06 g (6 ml solution of 1.0% by wt) one of three commercial scale inhibitors or a polymeric crystallization inhibitor in water to produce a treated composition having 0.04% (400 ppm) of the polymeric crystallization inhibitor. The three scale inhibitor compositions were (1) partially neutralized sodium diethylenetriaminepantakis (methylenephosphonate), (2) 1-hydroxy ethylidene 1,1-diphosphonic acid, and (3) a 50/50 blend of hydroxyethyl iminobis(methylene phosphonic acid) and 4-(phosphonomethyl)-2-hydroxy-2-oxo-1,4,2,-ox azaphosphorinane.

The treated composition was then exposed to HzS according to standard laboratory conditions, which involved exposing them to flowing nitrogen gas with 3000 ppmv H$_2$S through a 2 inch ID by 3 inch long column at a flow rate of 0.27 liters per minute and a pressure of 5 psig. The samples were then analyzed to determine the ability to removed H$_2$S, which are set forth.

These results indicated that in all cases, the ability of the media to remove H2S was significantly reduced, as indicated by the reduced % Sulfur loading (Table 1).

TABLE 1

| Additive | Amount of additive (ppmw) | sulfur loading (%) |
|---|---|---|
| none | 0 | 28.6 |
| Poly(acrylamidecodiallyl-dimethylam monium chloride) | 120 | 30.0 |
| partially neutralized sodium diethylenetriaminepantakis | 400 | 11.5 |

TABLE 1-continued

| Additive | Amount of additive (ppmw) | sulfur loading (%) |
|---|---|---|
| (methylenephosphonate) | | |
| 1-hydroxy ethylidene 1,1-diphosphonic acid | 400 | 11.8 |
| a 50/50 blend of hydroxyethyl iminobis (methylene phosphonic acid) and 4-(phosphonomethyl)-2-hydroxy-2-oxo-1,4,2,-ox azaphosphorinane | 400 | 11.6 |

Also, there was no change in the removal of the spent sample from the vessel. As with the untreated sample, drilling and scrapping with a screwdriver was necessary for these samples treated with these three scale inhibitor formulations. These results suggest that agglomeration resistance is not achieved with all types of scale inhibitors but with a specific subset thereof—the disclosed polymeric crystallization inhibitors.

It should be understood, of course, that the foregoing examples relate to preferred embodiments of the invention and that modifications may be made without departing from the spirit and scope of the invention as set forth in the following claims.

I claim:

1. A method for producing an agglomeration-resistant desulfurizing product for removing contaminants from a fluid stream, the method comprising:
    adhering a polymeric crystallization inhibitor to at least a surface of a desulfurizing product thereby resulting in the agglomeration-resistant desulfurizing product,
    wherein a primary component of the desulfurizing product comprises at least one metal oxide of the formula Me$_x$O$_y$·(H$_2$O)$_z$, 
    wherein Me is selected from groups 4-12 of the periodic table of elements, O is oxygen, $1 \leq x \leq 3$, $1 \leq y \leq 4$, and $0 \leq z \leq 10$, and
    wherein the agglomeration-resistant desulfurizing product does not contain a silicate.

2. The method of claim 1, wherein the adhering is accomplished by contacting the desulfurizing product with a solution or dispersion comprising the polymeric crystallization inhibitor.

3. The method of claim 1, wherein the adhering is accomplished by mixing polymeric crystallization inhibitor with the at least one metal oxide during a manufacture of the desulfurizing product.

4. The method of claim 1, wherein the polymeric crystallization inhibitor is at an amount that is in the range of about 10 ppm to about 1000 ppm based on the weight of the at least one metal oxide.

5. The method of claim 1, wherein the polymeric crystallization inhibitor is adsorbed or absorbed on the surface of the at least one metal oxide.

6. The method of claim 1, wherein the desulfurizing product comprises a homogeneous mixture of the at least one metal oxide and the polymeric crystallization inhibitor.

7. The method of claim 1, wherein the polymeric crystallization inhibitor is added a solid to a mixture of particles of the at least one metal oxide.

8. The method of claim 1, wherein the polymeric crystallization inhibitor is dissolved in a solvent prior to being contacted with particles of the at least one metal oxide.

9. The method of claim 1, wherein the polymeric crystallization inhibitor comprises:
    a salt of acrylamido-methyl propane sulfonate/acrylic acid copolymer;

a phosphonated maleic copolymer;

a salt of polymaleic acid/acrylic acid/acrylamido-methyl propane sulfonate terpolymers;

a copolymer that comprises an acrylamide moiety, a quaternary ammonium moiety, a quaternary ammonium salt moiety, an acrylate moiety, an acrylic acid moiety, or a combination thereof; or a combination thereof.

10. The method of claim 1, wherein the polymeric crystallization inhibitor comprises an acrylamide moiety, a quaternary ammonium moiety, a quaternary ammonium salt moiety, an acrylate moiety, an acrylic acid moiety, or a combination thereof.

11. The method of claim 10, wherein the quaternary ammonium salt moiety is selected from the group consisting of dimethyldiallylammonium chloride, acrylamidoethyltrimethylammonium chloride, acrylamide/dimethylaminoethyl acrylate methyl chloride quaternary ammonium salt, poly(acrylamide/dimethylaminoethyl methacrylate methyl chloride quaternary ammonium salt), poly(acrylamide/diallyldimethyl ammonium chloride), poly(dimethylaminoethyl acrylate methyl chloride quaternary ammonium salt), and poly(dimethylaminoethyl methacrylate methyl chloride quaternary ammonium salt).

12. The method of claim 10, wherein the polymeric crystallization inhibitor is an acrylamide moiety-quaternary ammonium salt moiety copolymer.

13. The method of claim 10, wherein the polymeric crystallization inhibitor is a poly(acrylamide-co-diallyldimethylammonium chloride).

14. The method of claim 1, wherein the Me is Fe, Zn, or combinations thereof.

15. The method of claim 1, wherein the at least one metal oxide further comprises an activator component comprising one or metal oxides that are different from that of the primary component and selected from the group consisting of $Cu_2O$, $CuO$, $Ag_2O$, $Au_2O_3$, $PtO_2$, $CdO$, $NiO_2$, $Ni_2O_3$, $PdO$, $PbO$, $Pb_3Q_4$, $PbO_2$, $Pb_2O_3$, $Pb_{12}O_{19}$, $HgO$, $SnO$, $SnO_2$, $CoO$, $Co_2O_3$, $Co_3O_4$, $MnO$, $Mn_3O_4$, $Mn_2O_3$, $MnO_2$, $Mn_2O_7$, $Al_2O_3$, and one or more combinations thereof.

16. The method of claim 1, wherein a temperature used to dry particles of the desulfurizing product is not greater than 150° C.

* * * * *